United States Patent [19]

Ullner

[11] 4,449,863
[45] May 22, 1984

[54] PIPE SWITCH FOR PNEUMATIC CONVEYING DEVICES

[75] Inventor: Klaus Ullner, Braunschweig, Fed. Rep. of Germany

[73] Assignee: Bühler-Miag GmbH, Braunschweig, Fed. Rep. of Germany

[21] Appl. No.: 340,728

[22] Filed: Jan. 19, 1982

[30] Foreign Application Priority Data

Jan. 24, 1981 [DE] Fed. Rep. of Germany ....... 3102384

[51] Int. Cl.³ ............................................. B65G 53/56
[52] U.S. Cl. ................................. 406/182; 137/625.47
[58] Field of Search ................... 406/182; 137/625.47, 137/874–876; 251/DIG. 1

[56] References Cited

U.S. PATENT DOCUMENTS 3,938,553 2/1976 Ortega ............................. 137/625.47
4,169,491 10/1979 Bajka ............................... 137/625.47
4,318,424 3/1982 Bajka ............................... 137/625.47

FOREIGN PATENT DOCUMENTS 1916581 3/1969 Fed. Rep. of Germany ........................ 137/625.47

Primary Examiner—John J. Love
Assistant Examiner—L. E. Williams
Attorney, Agent, or Firm—Michael J. Striker

[57] ABSTRACT

A pipe switch of the type having a stationary cylindrical housing enclosing a rotary cylindrical plug. The housing has a feeding connection for receiving pulverized or granular material and juxtaposed two discharging connections. The plug is formed with two diametral channels extending side-by-side so that in respective switching positions of the plug one of the channels connects the feeding connection to one of the discharging connections. The outlets and the inlets of the channels are surrounded by continuous sealing straps in such a manner that the distance in circumferential direction from the sealing strap and the adjoining side of the inlet or outlet openings is larger than the breadth of the inlet or outlet openings so that the sealing straps do not cross the edges of the mouth of the feeding and discharging connection pieces in the housing.

6 Claims, 4 Drawing Figures

PIPE SWITCH FOR PNEUMATIC CONVEYING DEVICES

BACKGROUND OF THE INVENTION

The present invention relates generally to a pipe switch for use in a pneumatic conveying unit used for transporting pulverized or granular material. The pipe switch is of the type having a housing delimiting together with at least cover a cylindrical inner space communicating with a feeding connection and a plurality of discharge connections. A rotary plug is contained in the inner space and is formed with a plurality of channels corresponding in number to the discharge connections. Control means are coupled to the plug to rotate the same into a plurality of switching positions in which during the transport of the pulverized or granular material the feeding connection is connected to a selected discharge connection. Air gap between the housing and the plug is sealed both at the inlet openings and at the outlet openings of the channels by means of sealing webs.

Pipe switches of this kind, which are used mainly for switching over the streams of pulverized or granular material, must be constructed with a certain play between the rotary plug and the stationary housing in order to obtain sufficient mobility of the plug. This play is achieved by an air gap between the plug and the housing in the range of one or more tenths of a millimeter. Such a minute play requires a considerable accuracy in manufacturing the plugs and the housings and perfectly cylindrical surfaces in the jacket of the plug and the inner wall of the housing. Such a high degree of accuracy, however, requires time-consuming and expensive manufacturing procedures.

If the air gap is not sealed, the deposits of dust and minute particles of material build up and clog the gap. As a consequence, the position-adjusting movement of the plug can be impaired or even blocked, particularly when thermal expansion occurs. Such prior-art switches without sealing means is known for example from the DD Pat. No. 27 714.

In another known pipe switch (German published patent application No. 1 916, 581 and German publication No. 1 555 057) annular grooves are formed in the inner wall of the housing around the mouth of respective feeding and discharging connections and sealing means in the form of blowable hose sections are inserted into these grooves for being blown up by pressure air and during the switching of the plug they are pressure-relieved. This kind of pipe switch therefore cannot be operated in the conveyed stream or during the conveying operation, and during the position-adjusting movement of the plug the edges of the channels of the latter override the sealing means so that the sealing hoses are mechanically strained and subject to additional wear.

Another pipe switch is known from prior-art, for instance from German published patent application Nos. 2 051 177 and 2 060 803 in which the plug is provided with one or more sealing pistons which are actuated mechanically, electromagnetically, pneumatically or hydraulically for sealing the unused connections in the housing. The sealing pistons during the position-adjusting movement of the plug are withdrawn from the inner wall of the housing in the counter-direction to its pressing force. Even this known pipe switch can be switched over only upon the interruption of the conveying process.

From the prior art it is also known a pipe switch (German published patent application No. 2 148 557) having a switchable plug provided with a curved channel the end openings of which are sealed by sealing means inserted in a recess in the plug body and surrounding the individual channel openings. The sealing means are in the form of blowable elastic hoses and in its blown up condition closely engage both the plug around the channel and the inner wall of the housing. Similarly as in the preceding examples, in this known embodiment of pipe switch the pressurized sealing hoses must be pressure-relieved in order to perform the switching movement, and the conveying stream of material must be interrupted.

SUMMARY OF THE INVENTION

It is therefore a general object of the present invention to overcome the aforementioned disadvantages.

More particularly, it is an object of the invention to provide an improved pipe switch of the aforedescribed type in which the air gap between the rotary plug and the inner wall of the housing is sealed in such a manner as to permit the switching movement of the plug during the conveying operation.

An additional object of the invention is to provide such an improved pipe switch in which during the position adjustment of the plug the edges of the housing body do not override the sealing means.

In keeping with these objects, and others which will become apparent hereafter, one feature of the invention resides, in a pipe switch of the aforedescribed kind, in the provision of a common sealing member for all outlets and of another common sealing member for all inlets of the channels in the rotary plug, the sealing members being seated in the jacket of the plug and enclosing the inlet and outlet whereby at least the sealing member which is assigned to the outlets of the channels is spaced apart in circumferential direction from the outlet of adjoining channels about a distance which exceeds the circumferential clearance of these outlets.

In the preferred embodiment of this invention, the sealing members are in form of rectangular frames arranged in such a manner that two opposite sides of the sealing frames extend in the circumferential direction of the plug and the other two opposite sides extend transversely to the circumferential direction. The sealing frames are made preferably in the form of round strands of an elastic material such as rubber or another suitable plastic material and the frames are assembled either of individual pieces or are manufactured as a single piece.

According to another advantageous embodiment of this invention, there are provided grooves in the jacket of the plug, the grooves extending both around all inlets of the channels and around all outlets of the channels and the sealing strands are inserted into these grooves. Preferably the grooves have a trapezoidal cross section with a longer base forming the bottom of the grooves and with the opposite shorter base opening into the upper surface of the plug to receive the sealing strands. In this manner it is achieved that the sealing strands are fixedly seated in the plug and withstand all loads in practical transporting operations, and enable an uninterrupted conveying operation.

Since it cannot be excluded that a hard particle or grain of the conveyed material displaces a sealing strand and penetrates into the air gap between the housing and the plug, there are provided, according to another feature of this invention, recesses which extend at both sides of the sealing means in the jacket of the plug. Clogging particles then fall through these recesses into the interior of the plug body where they are harmless and can be periodically removed therefrom by blowing for example. This cleaning operation can be carried out during the check-out of the sealing element, for example.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 2:
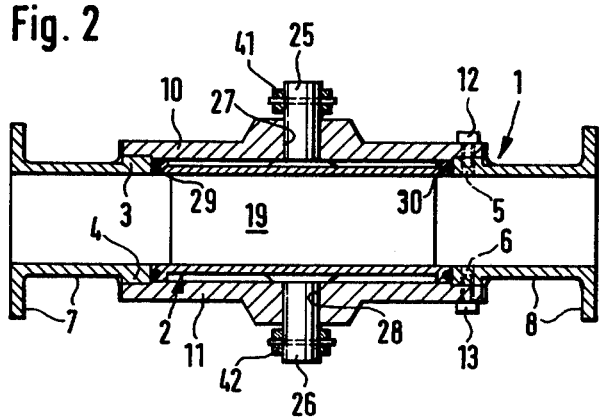
FIG. 2 is a sectional side view of the pipe switch of FIG. 1 taken along the line II—II.
Figure 3:
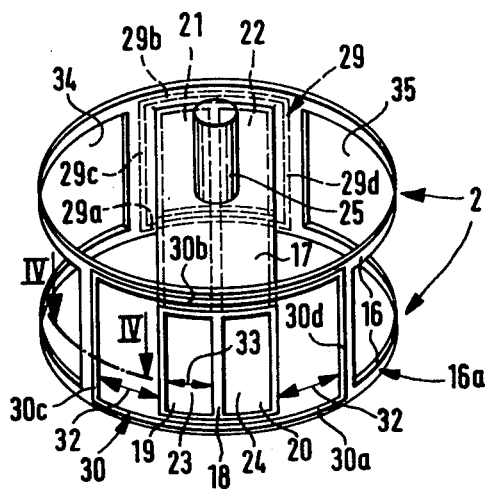
FIG. 3 is a perspective view of the rotary plug of the pipe switch.

In the drawings, there is illustrated a pipe switch embodied in the so-called two-way switch which consists substantially of a cylindrical housing 1 enclosing a rotary plug 2 and supporting control means for switching the plug. The housing 1 is in the form of a cylindrical jacket having at its upper edge a flange 3 and at its lower edge a flange 4. The flanges are provided with a plurality of threaded holes 5 or 6 distributed at regular intervals along the whole circumference of the housing jacket. Three connection pieces with flanges, namely a feeding connection piece 7 and two discharge connection pieces 8 and 9 are arranged opposite the feeding piece 7 for discharging the conveyed pulverized or granular material. It will be seen from FIG. 2 that the cylindrical jacket of the housing is closed with an upper lid or cover 10 and with a lower lid 11, the lids being releasably fastened to the housing jacket by screws 12 and 13 engaging the threaded holes. In the region between the feeding piece and the discharging piece 7, the housing 1 is provided with two radially projecting bearing supports 14 and 15 arranged in register one above the other for pivotably supporting a cylinder-and-piston unit 36 acting as control means for inparting a rotary movement to the plug 2. It will be seen from FIG. 3 that the plug 2 is assembled of a cylindrical jacket 16 defining a cylindrical outer surface 16a and a pair of parallel channels 19 and 20 formed in a duct 17 of a rectangular cross-section and opening at diametrically opposed locations in the plug jacket 16. The two channels 19 and 20 are separated by a partition 18 which defines also the channel inlets 21 and 22 and the channel outlets 23 and 24. Both the inlets and the outlets of the channels have equal rectangular cross-sectional areas. An upper pivot pin 25 and a lower pivot pin 26 are secured by welding for example to opposite sides of the rectangular duct 17 and extend in the axis of rotation of the plug 2. The pivot pins 25 and 26 are held for rotation in bearing bores 27 and 28 in the lids 10 and 11. In this manner, upon centering of the two lids 10 and 11 the plug 2 is coaxially rotated in housing 1 while a minute air gap is left between the inner wall of the housing and the outer circumference of the plug jacket (FIG. 2).

Figure 4:
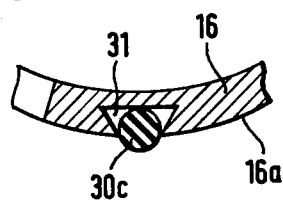
FIG. 4 is a sectional top view of a cut-away part of the jacket of the switching plug of FIG. 3 with the sealing means of this invention, taken along the line IV—IV.

Both the two inlets 21 and 22 and the two outlets 23 and 24 of channels 19 and 20 are surrounded by common sealing strands 29 and 30 which seal off the air gap between the inner wall 1a of housing 1 and the outer surface 16a of the plug jacket 16 and which are embedded in grooves 31 in the plug jacket. At least the sealing strand 30 surrounding the channel outlets 23 and 24 is spaced apart in the circumferential direction of the plug jacket from the adjoining sides of channel outlets 23 and 24 about a distance 32 which is larger than the breadth 33 of the individual channels 19 and 20. As will be seen particularly from FIG. 3, each of the seals 29 and 30 has a rectangular configuration assembled of two pairs of parallel strands 30a and 30b and 30c and 30d or 29a and 29b or 29c and 29d, which extend parallel to corresponding sides of channel outlets 23 and 24 or channel inlets 21 and 22. These sealing strands are made of a one-piece elastic strands of circular cross-section, such as round rope of silicon rubber for example. The individual sealing strands 29a–30d are inserted into a single recess groove 31 formed in the plug jacket 16 and having a trapezoidal cross-section (FIG. 4). Instead of assembling the individual rectangular seals of one-piece round cables, the four sides of the seals can also be made of four individual pieces of round cable.

In addition to the grooves 31 for the sealing strands 29a–30d, the plug 2 has on its jacket 16 cut-outs 34 and 35 through which material particles which accidentally pass across the sealing 29 and 30 in the air gaps between the plug 2 and the inner wall of housing 1 fall into the hollow spaces in the interior of plug 2.

Figure 1:
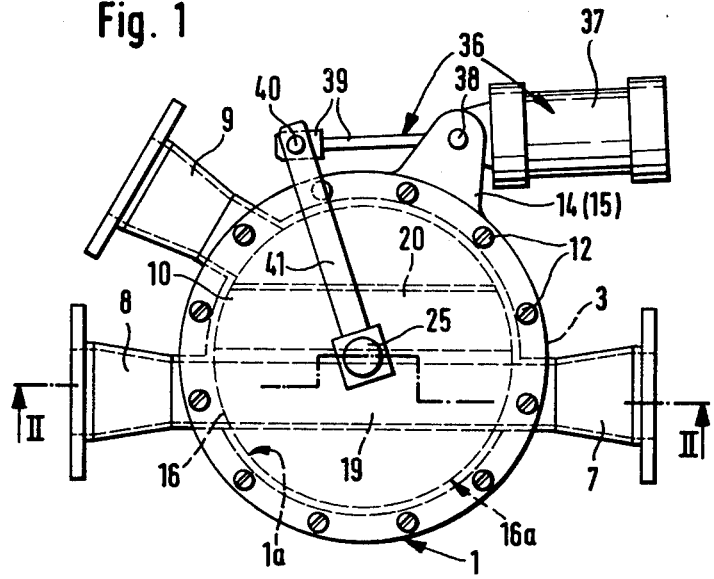
FIG. 1 is a plan view of a pipe switch with the associated control means.

Control means for imparting rotary movement to the plug 2 consist of a pneumatic cylinder-and-piston unit 36 the cylinder 37 of which is pivotably mounted by means of pin 38 on the bearing supports 14 and 15 on the housing. The piston rod 39 of the cylinder-and-piston unit is linked to an axle 40 which in turn is pivotable at the end of two levers 41 and 42 which at their opposite ends are fixed to respective pivot pins 25 and 26 (FIGS. 1 and 2).

By applying pressure air into the cylinder-and-piston unit 36 the piston rod 39 is driven either out of or into the cylinder 37 and thus adjusts via levers 41 and 42 the angular position of the plug 2. In one switching position, illustrated in FIG. 1, the plug 2 is adjusted to connect through channel 19 the feeding connection piece 7 to the discharge connection piece 8. In another angular position the feeding connection piece 7 is connected through channel 20 to the other discharging connection piece 9 of housing 1. During the switching or rotary movement of the plug 2 about its central axis, the two seals 29 and 30 hermetically seal the entire duct 17 in plug 2 which is attacked by pressure air from the connection piece 7 and prevent the discharge of the pressure air beyond the range of the mouth of the discharging pieces 8 and 9 in the housing jacket 1. During the movement of the plug 2 relative to the stationary housing 1, the sealing frames 29 and 30 slide on the inner wall 1a of the housing without overriding the rims of the mouth of the discharging connection pieces. This feature results from the fact that, as mentioned before, the circumferential distance of the rectangular sealing frames 29 and 30 is spaced apart in circumferential direction from the inlet channel about a distance 32 which exceeds the circumferential clearance of repsective channels and is smaller than the radian of the angular displacement of the plug 2.

In summary, the improvement achieved by this invention is in the fact that the particular construction of the sealing means permits the design of pipe switches in which the air gap between the rotary plug and the inner wall of the housing is advantageously closed in such a manner that the conveying process can continue even during the switching operation, and any sweeping of the sealing elements over the edges of inlet connection pieces for the conveyed material is avoided. Additional advantages can be seen in the ease of exchange of the plug and in less demanding manufacturing thereof, inasmuch as between the housing and the plug larger tolerances are admissible. Due to the larger air gap, the danger of seizing of the plug in the housing, caused by thermal expansions due to temperature variations, is eliminated. The manufacture of the pipe switch of this invention is less expensive also due to the fact that the inner wall of the housing need not be ground and the outer surface of the plug need not be finely machined.

It will be understood that each of the elements described above, or two or more together, may also find a useful application in other types of construction differing from the types described above.

While the invention has been illustrated and described as embodied in a specific embodiment of the pipe switch for use in conveying pulverized or granular material, it is not intended to be limited to the details shown since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A pipe switch for pneumatic conveyors, comprising a housing enclosing an inner space and being formed with a feeding connection for pulverized or granular material, and a plurality of discharging connections arranged opposite said feeding connection; a plug disposed for rotation in said space and having a plurality of transverse channels corresponding in number to said discharging connections; control means coupled to said plug for rotating the same into a plurality of switching positions in which one of said channels connects said feeding connection to a selected discharge connection; sealing means embedded in said plug and including two closed loops surrounding respectively the inlets and the outlets of said channels in the plug, said sealing loops being spaced apart in circumferential direction from the adjoining sides of said inlets and outlets respectively about a distance which exceeds the breadth of said inlets and outlets in circumferential direction so that during rotation of said plug between said switching positions, the sealing loops do not override said adjoining sides of the inlets and outlets.

2. A pipe switch as defined in claim 1, wherein said loops have a rectangular configuration defining two pairs of parallel strands of which one pair extends in circumferential direction of the plug and the other pair in transverse direction.

3. A pipe switch as defined in claim 2, wherein said loops are made of elastic round cords made of rubber or synthetic material.

4. A pipe switch as defined in claim 1, wherein the rotary plug has a jacket in the form of a cylindrical shell, a diametral duct of rectangular cross-section extending diametrically through the plug and opening into the jacket, at least one partition dividing the duct into respective channels; and grooves formed in the jacket around the inlet and outlet of said ducts for receiving said sealing means.

5. A pipe switch as defined in claim 4, wherein said grooves are of trapezoidal cross-section.

6. A pipe switch as defined in claim 4 wherein said cylindrical shell has cut-outs formed at both sides of said sealing means to permit entry of material particles accidentally penetrating across the sealing means into the interior of said plug.

* * * * *